(12) United States Patent
Ochi (10) Patent No.: US 6,179,383 B1
(45) Date of Patent: Jan. 30, 2001

(54) CHILD SEAT

(75) Inventor: Yasushi Ochi, Osaka (JP)

(73) Assignee: Oriental Sangyo, Ltd., Osaka (JP)

( * ) Notice: Under 35 U.S.C. 154(b), the term of this patent shall be extended for 0 days.

(21) Appl. No.: 09/449,551

(22) Filed: Nov. 29, 1999

(30) Foreign Application Priority Data

Sep. 6, 1999 (JP) .................................................. 11-251918

(51) Int. Cl.$^7$ ...................................................... B60N 2/28
(52) U.S. Cl. ................................... 297/250.1; 297/452.41
(58) Field of Search ............................... 297/250.1, 256.1, 297/256.13, 256.14, 216.11, 452.41

(56) References Cited

U.S. PATENT DOCUMENTS

| | | | |
|---|---|---|---|
| 4,687,452 | * | 8/1987 | Hull ................................. 297/250.1 X |
| 4,836,605 | * | 6/1989 | Greenwood et al. ............. 297/250.1 |
| 5,292,175 | * | 3/1994 | Artz .................................. 297/250.1 |
| 5,335,968 | * | 8/1994 | Sheridan et al. .................. 297/250.1 |
| 5,516,188 | * | 5/1996 | Bruhuke et al. .............. 297/250.1 X |
| 5,560,056 | * | 10/1996 | Tai ................................ 297/452.41 X |

FOREIGN PATENT DOCUMENTS

3544041 * 6/1987 (DE) .................................. 297/250.1

OTHER PUBLICATIONS

Patent Abstract of Japan No. 09267677 A, dated Oct. 14, 1997.
Patent Abstract of Japan No. 10119611 A, dated May 12, 1998.

* cited by examiner

Primary Examiner—Peter R. Brown
(74) Attorney, Agent, or Firm—Armstrong, Westerman, Hattori, McLeland & Naughton (57) ABSTRACT

A child seat 1 installable on a vehicle seat 100 includes a seat body 2 which is composed of an elastic member formed in a hollow and airtight structure and having a gas filling port and which is distended with a gas filled therein to define at least a backrest portion 4 and a seating portion 3; a safety belt 10 secured to the seat body 2 for restraining a seated child; and retaining means 30 for retaining the seat body 2, placed on the vehicle seat 100, in position on the vehicle seat 100. The seat body 2 is light in weight and easy to carry or install on the vehicle seat 100 because it is formed by filling a gas in the elastic member of the hollow and airtight structure.

8 Claims, 11 Drawing Sheets

CHILD SEAT

BACKGROUND OF THE INVENTION

1. Field of the Invention

The present invention relates to a child seat allowing a child to be safely seated on a passenger seat of a vehicle.

2. Description of the Related Art

The conventional child seats fall into broad categories: a so-called built-in type which is integrated into the vehicle seat, as disclosed in Japanese Unexamined Patent Publication No.9 (1997)-267677, and a type which is separate from the vehicle seat and designed to be securely installed on the vehicle seat, as disclosed in Japanese Unexamined Patent Publication No.10(1998)-119611.

The child seat of the former type is adapted to retract into the vehicle seat. Accordingly, the vehicle seat may readily be shifted to a normal adult seating position by retracting the child seat into the vehicle seat when the child seat is not used. This offers improved convenience of use. However, because of the integration into the vehicle seat, the child seat cannot be removed and hence, is not installable in different vehicles. That is, there is a disadvantage that the child seat is specific to the vehicle.

On the other hand, the child seat of the latter type has an advantage of being installable in different vehicles. However, this child seat suffers a rather great total weight because a seat body is highly rigidly constructed and a securing device is required for installing the seat body on the vehicle seat. This results in difficult operations for attaching or removing the child seat to or from the vehicle seat. Besides, an additional disadvantage is that a space is necessary for storing the removed child seat when it is not used.

In view of the foregoing, it is an object of the invention to provide a child seat which features lightweight, easy attachment or removal thereof with respect to the vehicle seat and convenience in handling the child seat when it is not used.

SUMMARY OF THE INVENTION

In accordance with the invention for achieving the above object, a child seat installable on a vehicle seat comprises: a seat body comprising an elastic member formed in a hollow and airtight structure and including a gas filling port, and distended with a gas filled therein to define at least a backrest portion and a seating portion; a safety belt secured to the seat body for restraining a seated child; and retaining means for retaining the seat body, placed on the vehicle seat, in position on the vehicle seat.

The child seat is arranged such that the seat body is distended with the gas filled therein through the gas filling port, thereby defining at least the backrest portion and the seating portion on which the child is seated. The child seated on the seat body is restrained by the safety belt for some movement. The seat body is increased in rigidity with increase in the pressure of the gas filled therein, thus becoming less susceptible to deformation by an external force. Additionally, the seat body is light in weight as formed by filling the gas in the elastic member of the hollow and airtight structure. Hence, the seat body is easy to carry or to install on the vehicle seat. Such a seat body is retained in position on the vehicle seat by the retaining means, as mentioned above. The seat body may be installed on the vehicle seat before or after the seat body is filled with the gas. However, the seat body is more flexible when unfilled with the gas and hence, is easier to install.

The seat body becomes flat when the gas therein is discharged from the gas filling port so that the flattened seat body on the vehicle seat permits a passenger to be seated thereon or a baggage or the like to be placed thereon. Shortly, the inventive child seat need not be removed from the vehicle seat when it is not used as the child seat and hence, is free of cumbersomeness in use. If the child seat were to be removed, the seat body with the gas discharged therefrom is so flexible as to be readily removed, requiring only a limited space for storage.

If an adhesive or the like is used for securing an end of the safety belt to the seat body, the secured portion may not have a sufficient adhesive strength. This leads to a fear that the secured portion may be broken by a tensile force applied to the safety belt, failing to ensure child safety. Therefore, it is preferred that the safety belt is secured to the seat body in a wrap-around fashion. In this arrangement, whether the safety belt is broken by the tensile force or not is dependent upon the tensile strength of the safety belt itself. Judged by the current technological common sense, it is more than practicable to impart the safety belt with a sufficient tensile force for positively ensuring the child safety.

During a collision of the vehicle, the child tends to be moved forwardly or otherwise laterally, or is subject to a lateral external force. In order to ensure the positive child safety, the seat body is preferably provided with a side guard for protection of lateral sides of the seated child. Alternatively, the side guard may preferably be extended along peripheral edges of the backrest portion and seating portion in a manner to surround the lateral sides, head and foots of the seated child. This provides protection of the lateral sides as well as the head and foots of the seated child. The side guard may be arranged such that a hollow portion therein is divided into plural segments for selective gas supply to any of these hollow segments. This arrangement permits an inside gap between the opposite side guard portions to be set according to the size of a child to be seated, so that the child may be held in a safer position as sandwiched between the side guard portions.

A trouble is expected to occur in association with some external force causing damage to the seat body surface, the damage extending to the inside of the seat body to result in leakage of the internal gas from the damaged portion and incapability of maintaining the given configuration of the seat body. It is preferred in the interest of the prevention of this trouble to cover the seat body with a cover sheet. A protective effect of the cover sheet may prevent the seat body surface from sustaining damage from the external force. An aesthetic appearance or an upscale image may be added to the child seat by forming this cover sheet of fabric, synthetic leather or natural leather.

There may be provided angle adjusting means for adjustment of an intersection angle between the backrest portion and the seating portion of the seat body. The vehicle seats vary in the backrest angle depending upon the vehicle types. Some vehicles are available with a so-called reclining seats for varying the backrest angle. If the angle adjusting means permits adjustment for the backrest angle of the seat body, the backrest portion of the seat body may be brought into a positive contact with the backrest of the vehicle seat by coinciding the backrest angle of the seat body with that of the vehicle seat. This ensures that the child seat rests on the vehicle seat in a stable manner.

There may be provided gas supply means for feeding a pressurized gas into the seat body through the gas filling port. In this arrangement, the seat body may be distended with the gas fed thereinto by the gas supply means thereby to define the backrest portion and the seating portion. Thus, the seat body is readily brought into a ready-to-use condition.

Provision of a relief valve at the seat body is effective to prevent rupture of the seat body as a result of increase in the air pressure of the seat body in association with temperature rise in the vehicle cabin.

DETAILED DESCRIPTION OF PREFERRED EMBODIMENTS

Figure 1:
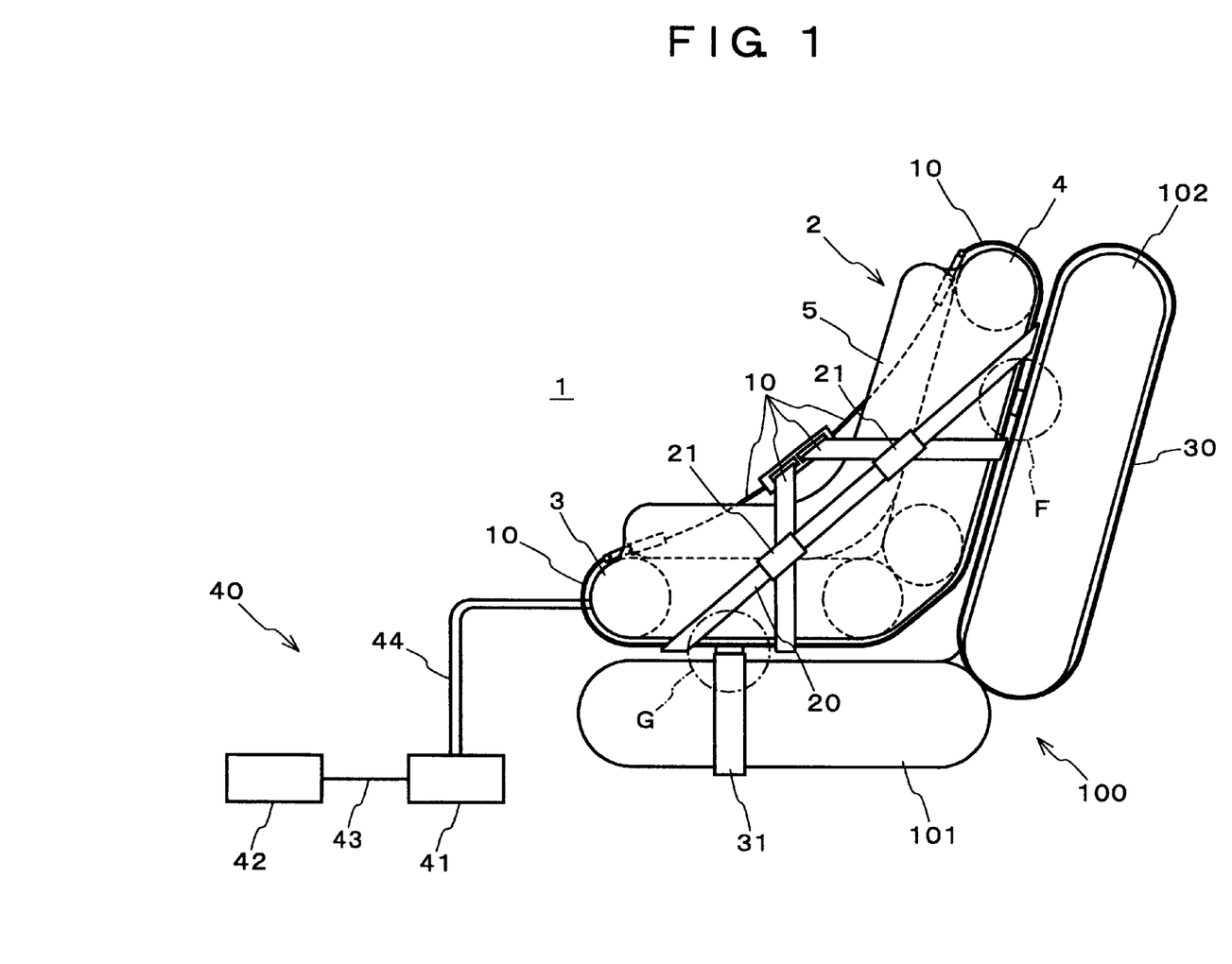
FIG. 1 is a side view schematically showing a structure of a child seat in accordance with one embodiment of the invention.

Specific embodiments of the invention will hereinbelow be described in detail with reference to the accompanying drawings. FIG. 1 is a side view schematically showing a structure of a child seat in accordance with an embodiment of the invention.

As seen in FIG. 1, the inventive child seat 1 is installed on a vehicle seat 100 and principally includes a seat body 2 upon which a child is seated, a safety belt 10 secured to the seat body 2 in a wrap-around fashion, gas supply means 40 for feeding a pressurized gas into the seat body 2, and retainer belts 30, 31 for retaining the seat body 2 on the vehicle seat 100.

Figure 2:
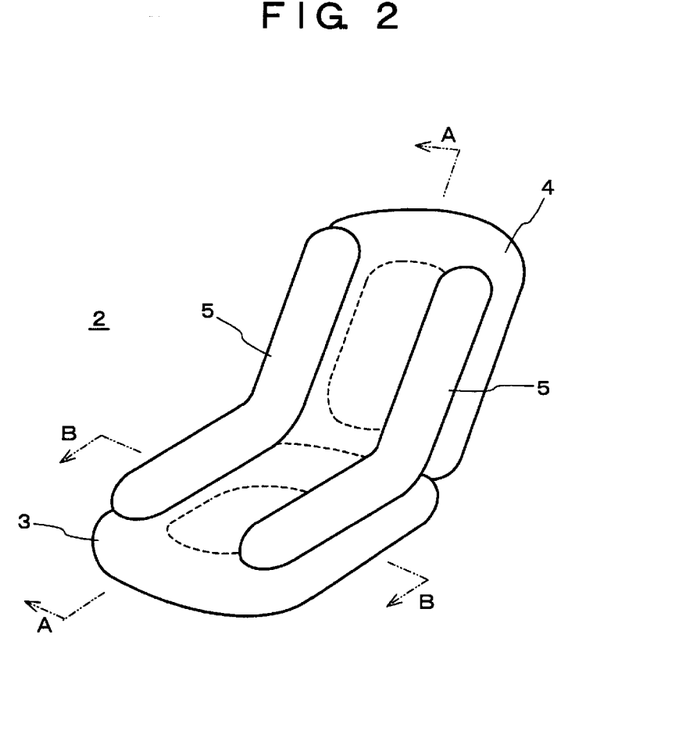
FIG. 2 is a perspective view showing a seat body in accordance with the embodiment hereof.
Figure 3:
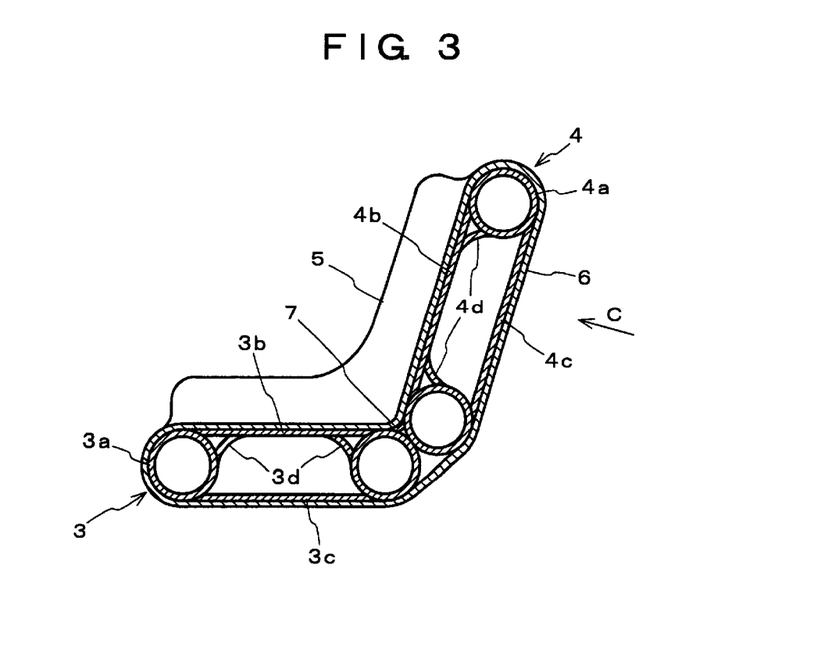
FIG. 3 is a sectional view taken on the lines A—A of FIG. 2.
Figure 4:
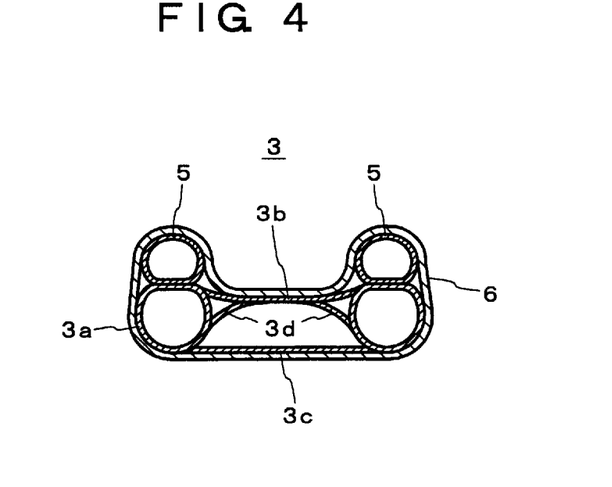
FIG. 4 is a sectional view taken on the lines B—B of FIG. 2.

FIG. 2 is a perspective view showing the seat body 2 of the embodiment, FIG. 3 is a sectional view taken on the lines A—A of FIG. 2, and FIG. 4 is a sectional view taken on the lines B—B of FIG. 2. As illustrated by these figures, the seat body 2 of the embodiment is composed of an elastic member of a hollow and airtight structure having a gas filling port (not shown). The seat body includes a seating portion 3, a backrest portion 4 and a side guard 5. Preferably used as the elastic member composing the seat body 2 is a synthetic resin sheet, such as vinyl sheet, urethane sheet and the like, which has airtightness and some elasticity so as to be capable of forming an airtight hollow portion as fused at joints.

The seating portion 3 and backrest portion 4 constituting the seat body 2 are each constructed by forming a tubular elastic member into a ring (annular) shape and closing an area inside the ring with circular sheet members 3b, 3c or 4b, 4c. The sheet members 3b, 3c and 4b, 4c are reinforced at respective peripheral joint portions thereof by means of reinforcing members 3d, 4d which are bonded to the ring portions 3a, 4a and the sheet members 3b, 4b, respectively. The seating portion 3 and the backrest portion 4 are interconnected by an interconnecting member 7 bonded to both of the ring portions 3a, 4a. An intersection angle between the seating portion 3 and the backrest portion 4 or the angle (inclination) of the backrest portion 4 relative to the seating portion 3 can be changed by bending the interconnecting member.

The side guard 5 is formed of the elastic member of a tubular and closed structure. The side guard 5 extends along opposite side ends of the seating portion 3 and the backrest portion 4 as bonded to the both. As seen in FIGS. 1 to 3, the side guard 5 thus extended is bent into a hooked shape in correspondence with the intersecting position of the seating portion 3 and the backrest portion 4.

The seat body 2 composed of the seating portion 3, backrest portion 4 and side guard 5 has its overall periphery covered with a cover sheet 6 for preventing the trouble that the damage to the seat body 2 from the external force causes the leakage of internal gas through the damaged portion, resulting in the incapability of maintaining the given configuration of the seat body 2. Usable as such a cover sheet 6 is a fabric, synthetic leather, natural leather or the like. The use of such a material may add the aesthetic appearance or the upscale image to the child seat.

Figure 5:
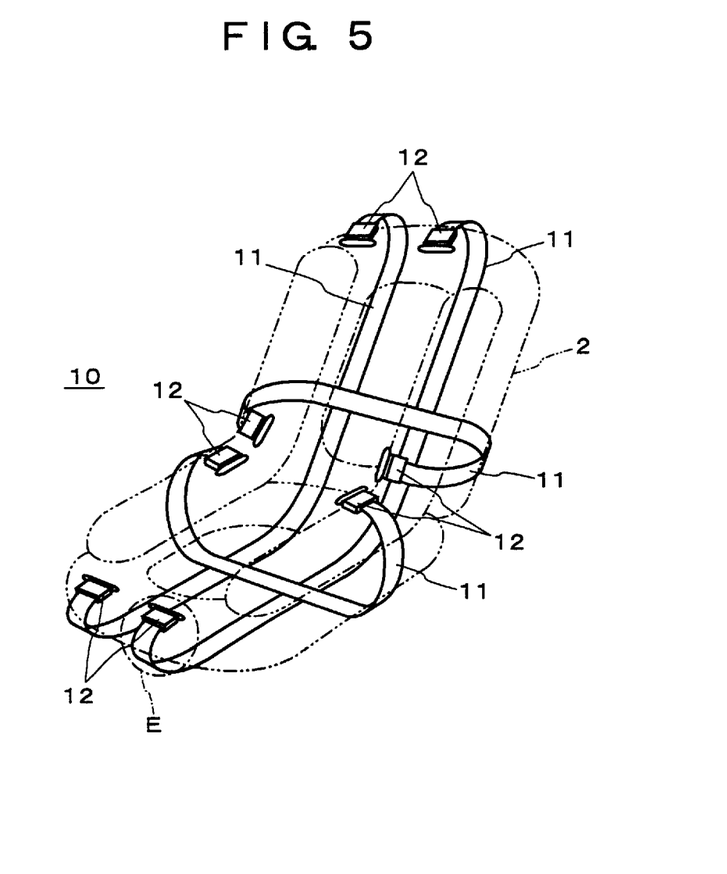
FIG. 5 is a perspective view showing a safety belt in accordance with the embodiment hereof.
Figure 6:
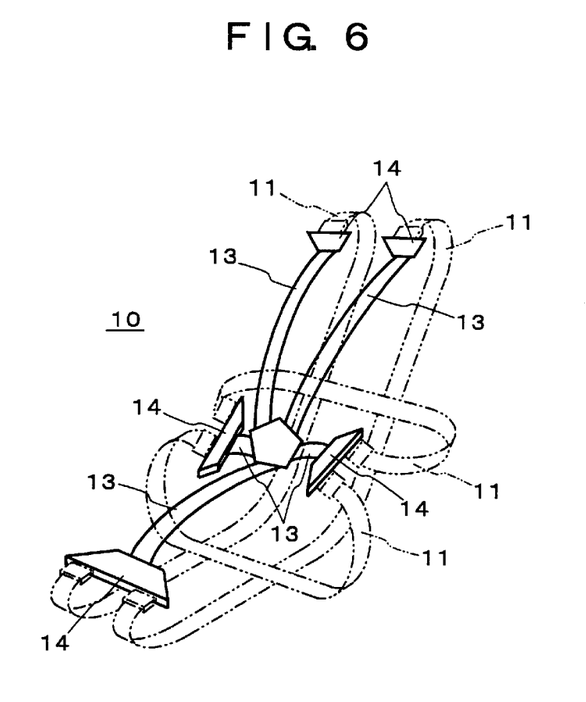
FIG. 6 is a perspective view showing the safety belt in accordance with the embodiment hereof.
Figure 7:
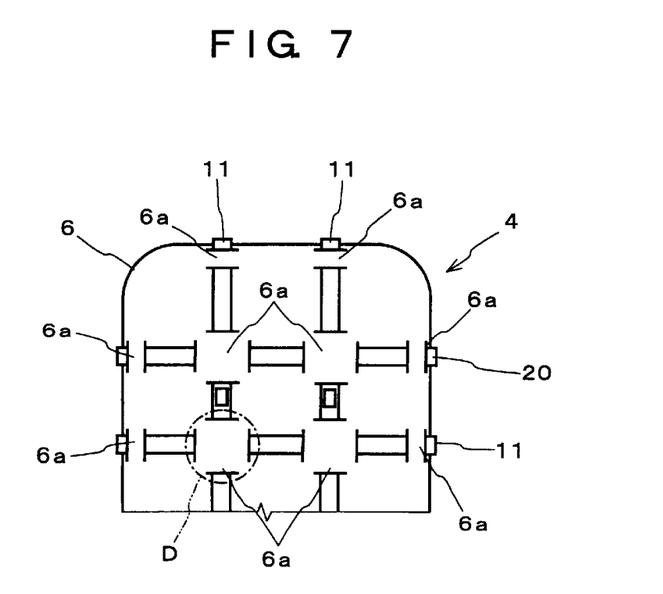
FIG. 7 is a rear view taken in the direction of the arrow C of FIG. 3.
Figure 8:
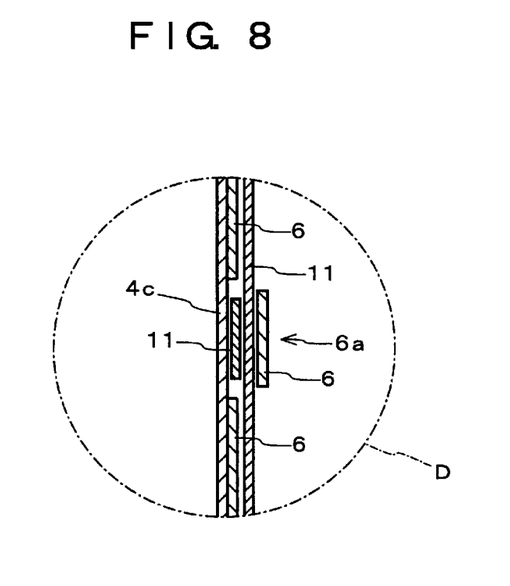
FIG. 8 is a sectional view showing the portion D of FIG. 7.

As shown in FIGS. 5 and 6, the safety belt 10 has fastening metal pieces 12 fixed to its ends, and includes a rear belt 11 secured to the seat body 2 in the wrap-around fashion and a front belt 13 with fastening metal pieces 14 fixed to its ends, the fastening metal pieces 14 engaging with the fastening metal pieces 12. FIG. 7 is a rear view taken in the direction of the arrow C of FIG. 3. As seen in the figure, the cover sheet 6 is formed with belt holes 6a at suitable places such that the rear belt 11 is threaded through the belt holes 6a thereby to be secured to the seat body 2. FIG. 8 is a sectional view showing the portion D of FIG. 7. As seen in the figure, a longitudinally extended rear belt 11 and a transversely extended rear belt 11 are threaded through the belt hole 6a in a manner to intersect thereat.

Figure 9:
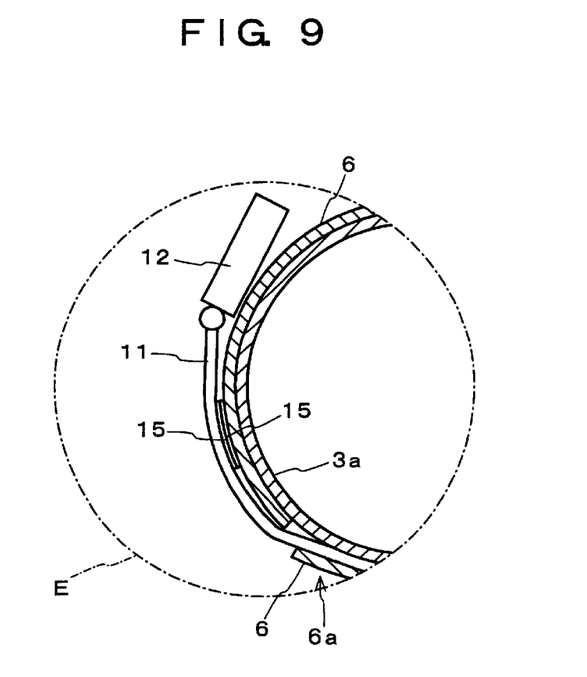
FIG. 9 is a sectional view showing the portion E of FIG. 5.

FIG. 9 is a sectional view showing the portion E of FIG. 5. As seen in the figure, each end of each rear belt 11 is fastened to the cover sheet 6 by means of a hook-and-loop fastener 15 so that the rear belt is prevented from depending downward by gravity. Besides the hook-and-loop fastener 15, a snap fastener, magnet plate and the like are usable as means for fastening the rear belt 11 to place.

Figure 10:
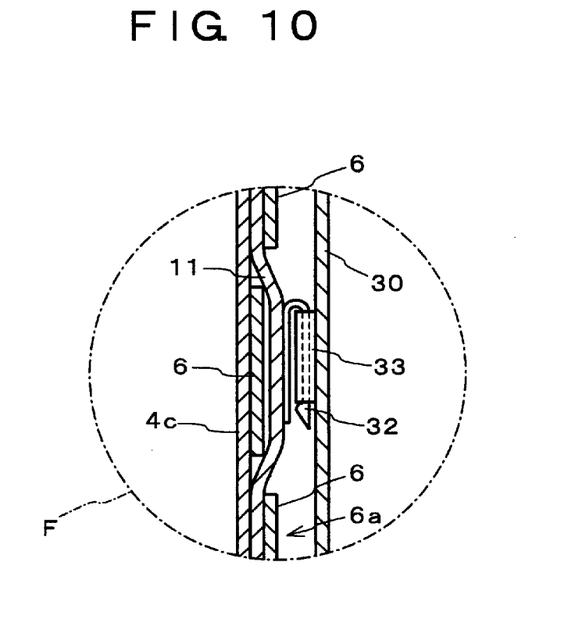
FIG. 10 is a sectional view showing the portion F of FIG. 1;.
Figure 11:
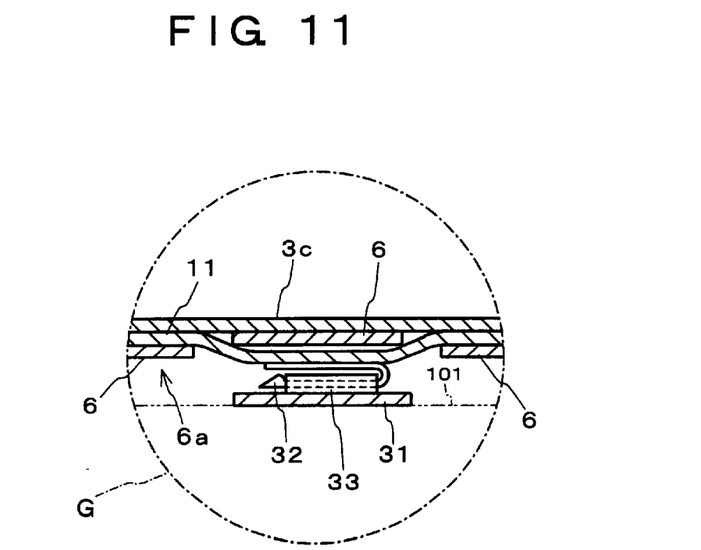
FIG. 11 is a sectional view showing the portion G of FIG. 1.

The retainer belt 30 is wound about a backrest portion 102 of the vehicle seat 100 along a longitudinal (vertical) direction thereof whereas the retainer belt 31 is wound about a seating portion 101 of the vehicle seat 100 along a transverse direction thereof. As shown in FIGS. 10 and 11, the rear belt 11 is secured to each of the retainer belts 30, 31 by way of engagement between a hook 32 and engagement metal piece 33. The hook 32 is secured to the rear belt 11 by riveting or the like and has its hooked portion inserted in the engagement metal piece 33 of a tubular shape. Incidentally, FIG. 10 is a sectional view showing the portion F of FIG. 1 whereas FIG. 11 is a sectional view showing the portion G of FIG. 1.

Figure 12:
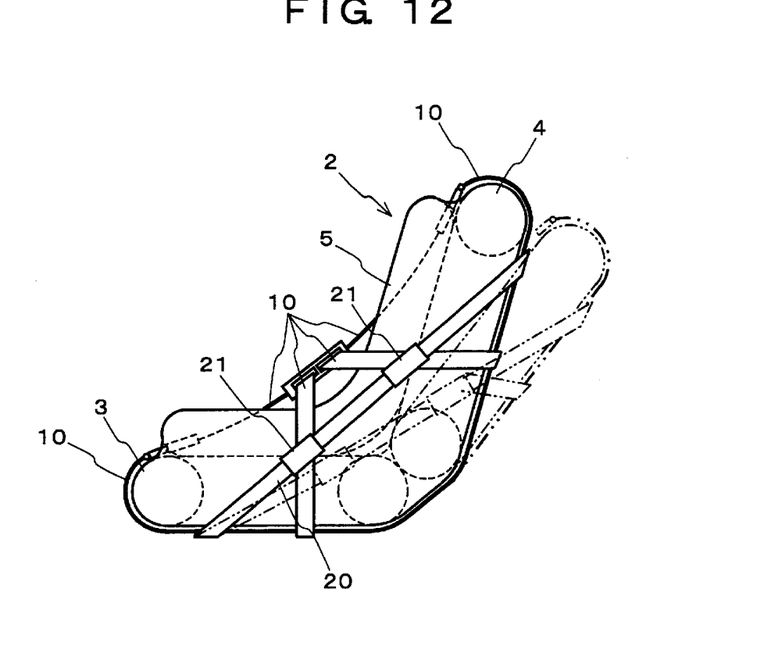
FIG. 12 is a side view principally showing the seat body in accordance with the embodiment hereof.

As shown in FIG. 12, an angle adjusting belt 20 is in a ring-like form so as to be wrapped around the seating portion 3 and backrest portion 4 of the seat body 2, supporting the seating portion 3 and backrest portion 4 in a manner to define a predetermined intersection angle therebetween. Both ends of the angle adjusting belt 20 are intercoupled by means of a buckle 21 such as used with a trousers belt. Adjusting this buckle 21 provides adjustment for the length of the angle adjusting belt 20 forming the ring, thereby allowing for change in the intersection angle between the seating portion 3 and the backrest portion 4 or the inclination of the backrest portion 4, as indicated by the two-dot chain line in the figure. Similarly to the aforesaid safety belt 10, the angle adjusting belt 20 is threaded through the belt holes 6a formed in the cover sheet 6, as shown in FIG. 7, thereby being secured to the seat body 2.

As shown in FIG. 1, the gas supplymeans 40 includes a compressor 41 which compresses sucked air for discharging the compressed air, a feed pipe 44 for supplying the seat body 2 with the air compressed by the compressor 41, and a power source 42 for power supply to the compressor 41. Usable as the power source 42 is a battery which may be composed of a battery installed in the vehicle or a battery other than the above. In the figure, a reference numeral 43 represents a wiring for interconnection between the power source 42 and the compressor 41.

In the seat body 2 to which the compressed air is supplied from the compressor 41, the seating portion 3, backrest portion 4 and side guard 5, as the components of the seat body, may define an independent airtight portion, respectively, or may be communicated with one another. In the case where the independent airtight portions are defined, the seating portion 3, backrest portion 4 and side guard 5 are respectively provided with the gas filling ports (not shown) which are individually connected to the feed pipe 44 for individual feeding of the compressed air from the compressor 41. In the case where the seating portion 3, backrest portion 4 and side guard 5 are communicated with one another, any one of these components is provided with the gas filling port (not shown) which is connected to the feed pipe 44 for feeding of the compressed air from the compressor 41.

The child seat 1 of the aforementioned structure is installed on the vehicle seat and used in the following manners. The description will be given on the assumption that the seat body 2 is not yet filled with the gas and the front belt 13 of the safety belt 10 is not coupled to the rear belt 11.

First, as shown in FIG. 1, the retainer belts 30, 31 are installed on the seating portion 101 and backrest portion 102 of the vehicle seat 100, respectively. Then, the hook 32 of the rear belt 11 of the safety belt 10 is inserted in the engagement metal piece 33 of the retainer belt 30 for intercoupling the belts. Thus the rear belt 11 is coupled to the vehicle seat 100 by means of the retainer belt 30.

Subsequently, the compressor 41 is activated to feed the compressed air into the seat body 2. As shown in FIGS. 1 and 2, the seat body 2 is distended with the compressed air thus supplied, thereby defining the seating portion 3, the backrest portion 4 and side guard 5, respectively. The seat body 2 is increased in the rigidity as the internal pressure is increased by the gas filling. At the time when the seat body is determined to have achieved a desired rigidity for resisting the deformation by the external force, the operation of the compressor 41 is stopped so as to stop feeding the compressed air to the seat body 2. In a case where the inclination of the backrest portion 4 does not coincide with that of the backrest portion 102 of the vehicle seat 100, the buckle 21 of the angle adjusting belt 20 is adjusted for establishing the inclination coincidence. Thus, the seat body 2 is ready to seat the child thereon. The seat body 2 may be installed on the vehicle seat 100 after it is filled with the gas. However, the installation is more easily performed before the filling of the gas because the seat body free of the gas is more flexible and easier to handle.

After the child is seated on the seat body 2, the front belt 13 of the safety belt 10 is coupled to the rear belt 11. Thus, the child is embraced by the safety belt 10 with the seat body 2 interposed therebetween, thereby being restrained for some movement. In this manner, the forward or lateral movement of the child during the vehicle collision is prevented by the safety belt 10 coupled to the vehicle seat 100 and by the side guard 5 of the seat body 2 and thus, the child safety is ensured.

If an adhesive or the like is used to bond the end of the safety belt 10 to the seat body 2, the bonded portion does not attain a sufficient adhesive strength. This leads to a fear that the bonded portion may break when the safety belt 10 is subject to the tensile force, negating the assurance of the child safety. In contrast, the embodiment is designed to secure the safety belt to the seat body 2 in the wrap-around fashion. Since the breakage of the safety belt 10 depends upon the tensile strength of the safety belt 10 itself and it is more than practicable to impart the safety belt 10 with a sufficient tensile strength, the embodiment can ensure the child safety.

When the vehicle collides, the child may receive a lateral external force which may cause injury. However, the embodiment is designed such that the child is sandwiched by the side guard 5 which absorbs the above external force. Thus, the child safety is ensured.

The child seat 1 of the embodiment offers merits of being light in weight and easy to carry and to install on the vehicle seat 100 because it is formed by filling the gas in the seat body 2 of the elastic member of the hollow and airtight structure.

In a case where the child is not seated on the child seat 1, the seat body 1 can be flattened by discharging the gas therein through the gas filling port (not shown), so as to allow a passenger other than the child to be seated on the child seat 1 remaining installed on the vehicle seat 100. Furthermore, the flattened child seat also allows the baggage or the like to be placed thereon. In this manner, the cumbersomeness in handling the child seat is eliminated because the child seat 1 need not be removed from the vehicle seat 100 when it is not used. Additionally, if the child seat were to be removed, the seat body 2 free of the internal gas is highly flexible, facilitating the operation for the removal thereof.

The trouble is expected to occur in association with some external force causing damage to the seat body surface, the damage extending to the inside of the seat body to result in leakage of the internal gas from the damaged portion and incapability of maintaining the given configuration of the seat body. According to the embodiment, however, the seat body 2 is covered with the cover sheet 6, which is effective to protect the seat body 2 against the damage from the external force. Incidentally, the child seat 1 may be imparted with the aesthetic appearance or the upscale image by forming the cover sheet 6 of the fabric, synthetic leather or natural leather.

The vehicle seat 100 is varied in the inclination of the backrest portion 102 depending upon the vehicle types. Some vehicles are available with the so-called reclining seat adapted to vary the inclination of the backrest portion. The embodiment employs the angle adjusting belt to permit adjustment for the inclination of the backrest portion 4 of the seat body 2. Thus, the inclination of the backrest portion 4 of the seat body 2 may readily be brought into coincidence with that of the backrest portion 102 of the vehicle seat 100 thereby to ensure the positive contact between the backrest portion 4 and the backrest portion 102. This permits the child seat 1 to be placed in the stable position on the vehicle seat 100.

Additionally, the embodiment employs the gas supply means 40 for feeding the gas into the seat body 2 for expansion, thereby to form the seating portion 3 and the backrest portion 4. This offers an easy way to bring the seat body into the ready-to-use condition.

Figure 13:
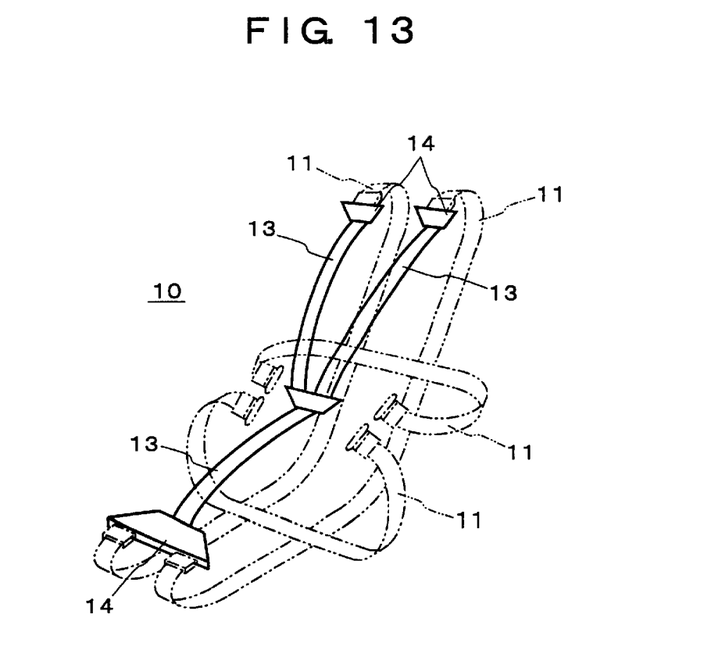
FIG. 13 is a perspective view showing a safety belt in accordance with another embodiment hereof.
Figure 14:
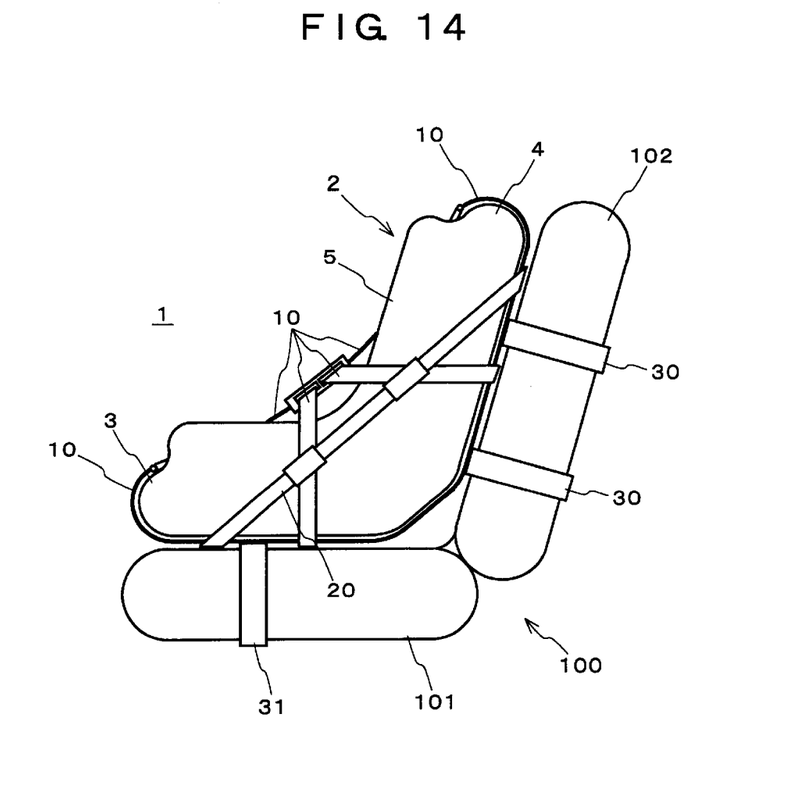
FIG. 14 is a side view showing a safety belt in accordance with still another embodiment hereof.
Figure 15:
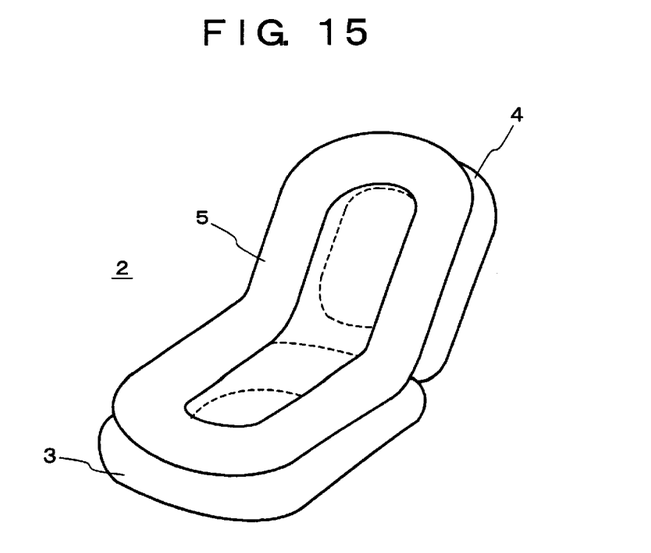
FIG. 15 is a perspective view showing a seat body in accordance with another embodiment hereof.

Although the child seat 1 according to one embodiment of the invention has been described, it is apparent that the specific embodiment of the invention is not limited to this. As shown in FIG. 13, for example, the safety belt 10 may have an arrangement in which the front belt 13 is fastened to the rear belt 11 at three points rather than at five points according to the embodiment of the invention. The safety belt of this arrangement is capable of fully ensuring the child safety, negating a particular need for the two of the rear belt 11 that are not fastened to the front belt 13. As shown in FIG. 14, the retainer belt 30 may be transversely wound about the backrest portion 102 of the vehicle seat 100. Although not particularly illustrated, the retainer belt 31 may be longitudinally wound about the seating portion 101 of the vehicle seat.

Instead of extending the side guard 5 along the opposite side ends of the seating portion 3 and backrest portion 4, the side guard may be formed into a ring shape extended in a manner to surround the head and foots of the seated child. This provides protection of the lateral sides as well as the head and foots of the seated child.

In stead of the aforementioned safety belt 10, a safety belt may be formed in the same tubular and airtight structure as the side guard 5. This alternative safety belt is distended with the gas filled therein, and disposed in a manner to bridge the side guard portions 5, 5 for protection of a seat occupant. Furthermore, the safety belt of this structure may be increased in width to cover an area extended between the side guard portions 5, 5 and downwardly of an intermediate portion of the side guard 5.

An alternative arrangement may be made as follows. The aforementioned gas filling port (not shown) is provided with a check valve to provide a sealable gas filling port (not shown) whereas a sealable gas discharge port is provided at the seat body 2. The aforesaid feed pipe 44 removed from the gas filling port (not shown) may be connected to the gas discharge port for positively discharging the gas from the seat body 2 by operating the compressor 41 in reverse. This arrangement allows for the separation of the gas supply means 40 from the seat body 2. Besides, the child seat 1, when not used, is quickly contracted to permit a passenger other than the child to be seated on the vehicle seat 100. Additionally, the provision of the relief valve at the seat body 2 may prevent the seat body 2 from being ruptured by increased pressure in the seat body 2 in association with the temperature rise in the vehicle cabin.

Figure 16:
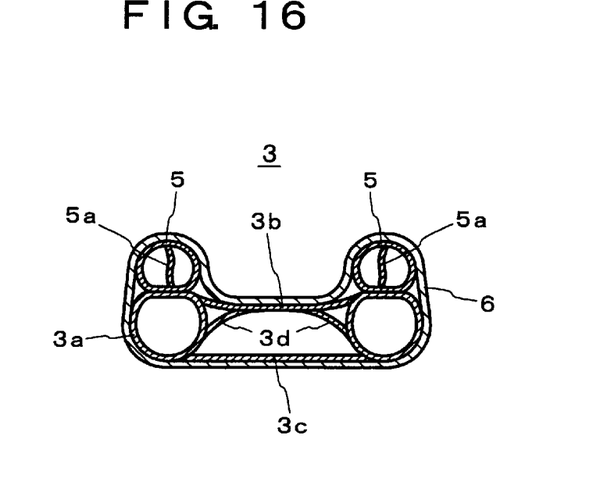
FIG. 16 is a sectional view showing a seat body in accordance with yet another embodiment hereof.

As shown in FIG. 16, the side guard 5 may have an alternative arrangement wherein a hollow portion thereof is divided into plural hollow segments by a partition wall 5a for selective feeding of the compressed air to any of the hollow segments. With this arrangement, an inside gap between the side guard portions 5 may be set according to the size of a child to be seated, who is stably seated as sandwiched between the safe guard portions 5. Thus, the child may be held in a safer position.

Figure 17:
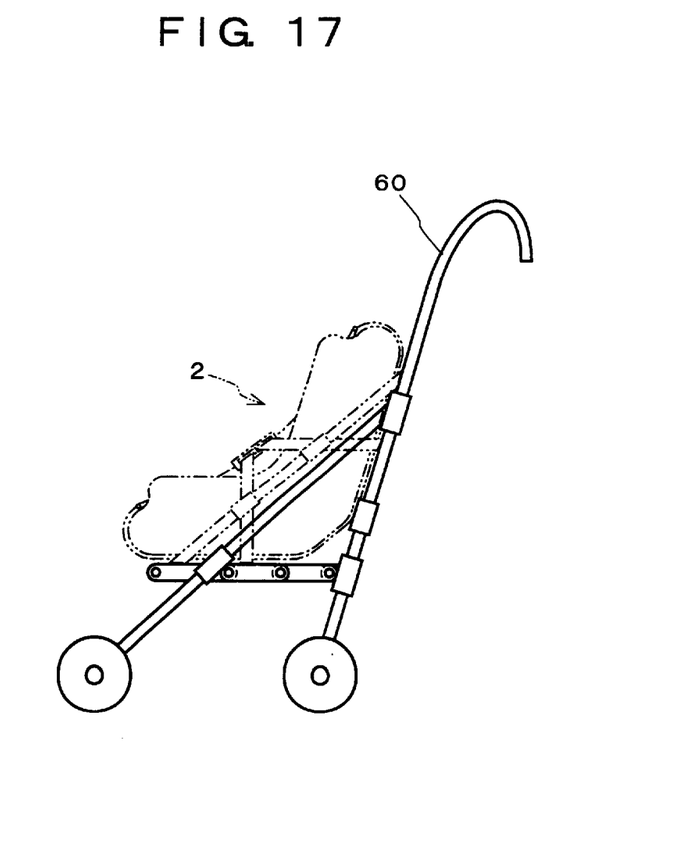
FIG. 17 is an illustrative diagram showing an example of use of the child seat in accordance with the embodiment hereof.

As mentioned supra, the gas supply means 40 may be separated from the seat body 2 by using the arrangement wherein the gas filling port (not shown) is provided with the check valve for providing the sealable gas filling port (not shown) and the sealable gas discharge port is provided at the seat body 2. This permits the seat body 2 to be used as removed from the vehicle seat 100. The seat body 2 according to the invention is light in weight and easy to carry because it is formed by filling the gas in the elastic member of the hollow and airtight structure. Accordingly, the seat body 2 removed from the vehicle seat 100 is readily installed in a carrier 60, as shown in FIG. 17. This permits the seat body 2 to be used with a baby carriage as well, which is economical. With the inventive child seat, the child may be safely brought to shopping or the like.

Figure 18:
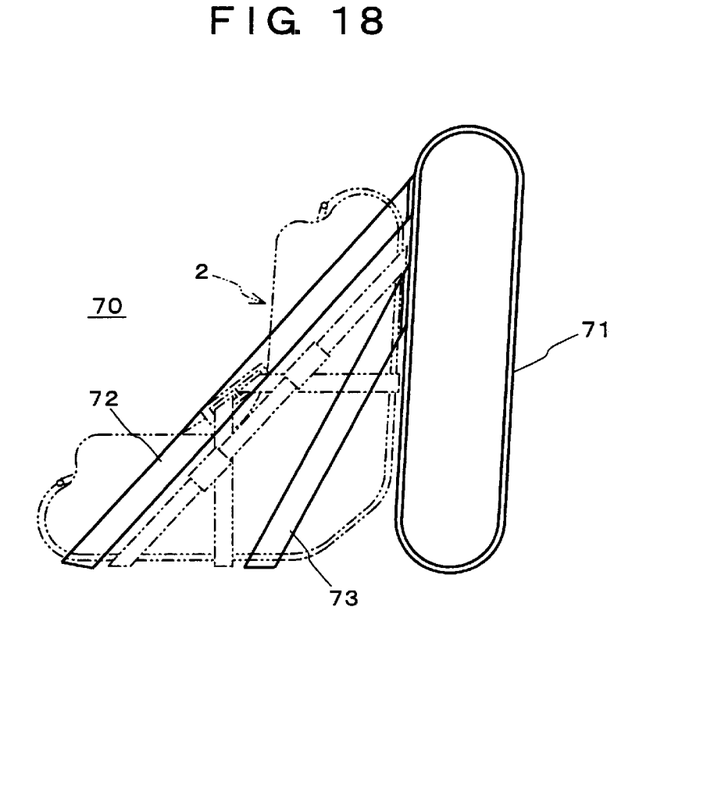
FIG. 18 is an illustrative diagram showing another example of use of the child seat in accordance with the embodiment hereof.
Figure 19:
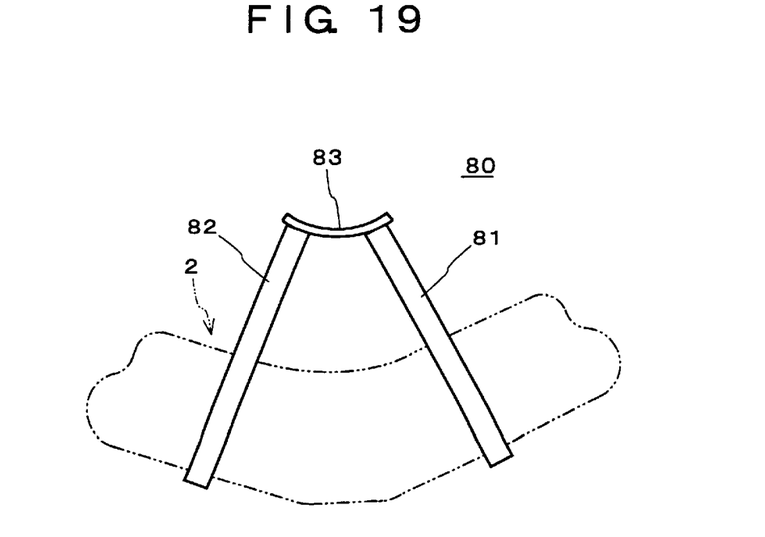
FIG. 19 is an illustrative diagram showing yet another example of use of the child seat in accordance with the embodiment hereof.
Figure 20:
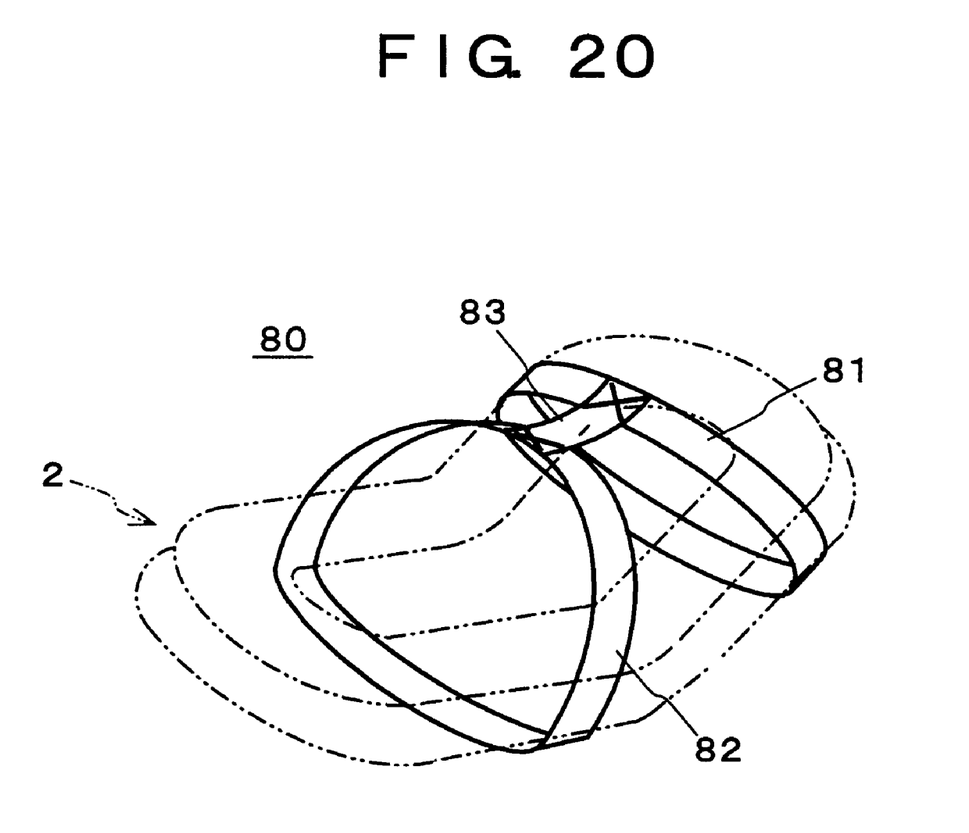
FIG. 20 is an illustrative diagram showing still another example of use of the child seat in accordance with the embodiment hereof.

Alternatively, the seat body 2 may be used with a carrier 70 including a shoulder belt 71, and support belts 72, 73, which are all formed in a ring-like shape, as shown in FIG. 18. If supported by the support belts 72, 73, as shown in the figure, the seat body 2 may be carried on the back. This allows the child to be safely carried in a piggyback fashion. Otherwise, the seat body may be used with a carrier 80 wherein two support belts 81, 82 formed in a ring-like shape are coupled together by a coupling member 83. If supported by the support belts 81, 82, the seat body 2 may be carried on the carrier 80 dangling on the arm, allowing the child to be carried safely.

What is claimed is:

1. A child seat installable on a vehicle seat comprising:
    a seat body comprising an elastic member formed in a hollow and airtight structure and including a gas filling port, and distended with a gas filled therein to define at least a backrest portion and a seating portion,
    a safety belt secured to said seat body for restraining a seated child, and
    retaining means for retaining the seat body placed on said vehicle seat, in position on said vehicle seat,
    said seat body including a side guard for protection of lateral sides of the seated child having a hollow portion divided into plural segments for selective feeding of a gas to any of the hollow segments so as to vary an inside gap between said side guard portions.

2. The child seat as claimed in claim 1, wherein said safety belt is wrapped around said seat body.

3. The child seat as claimed in claim 1, wherein said seat body is covered with a cover sheet.

4. The child seat as claimed in claim 1, further comprising angle adjusting means connected at one end to said backrest portion and at an opposite end to said seating portion for adjusting an intersection angle between the backrest portion and the seating portion of said seat body.

5. The child seat as claimed in claim 1, further comprising gas supply means for feeding a pressurized gas to said seat body through said gas filling port.

6. The child seat as claimed in claim 1, wherein said seat body is provided with a relief valve.

7. A child seat installable on a vehicle seat comprising:

a seat body comprising an elastic member formed in a hollow and airtight structure and including a gas filling port, and distended with a gas filled therein to define at least a backrest portion and a seating portion, a safety belt secured to said seat body for restraining a seated child, and retaining means for retaining the seat body placed on said vehicle seat, in position on said vehicle seat, said seat body including a side guard extending along peripheral edges of said backrest portion and seating portion to surround the lateral sides, head and feet of a seated child.

8. The child seat as claimed in claim 7, wherein a hollow portion in said side guard is divided into plural segments for selective feeding of the gas to any of the hollow segments so as to vary the size of the cavity formed by the side guard.

* * * * *